United States Patent [19]

Clark

[11] Patent Number: 4,585,136
[45] Date of Patent: Apr. 29, 1986

[54] ATTACHMENT OF RINGS TO ARTICLES
[75] Inventor: John Clark, Cheddar, England
[73] Assignee: BAJ Vickers Limited, England
[21] Appl. No.: 450,061
[22] Filed: Dec. 15, 1982
[30] Foreign Application Priority Data Dec. 16, 1981 [GB] United Kingdom ............... 8137666

[51] Int. Cl.$^4$ ........................... B32B 1/02; B32B 1/08
[52] U.S. Cl. ......................................... 220/3; 220/73;
220/288; 220/414; 428/36; 428/156; 428/168;
428/172
[58] Field of Search ..................... 428/36; 220/3, 414,
220/73, 288, 465

[56] References Cited
U.S. PATENT DOCUMENTS

| | | | |
|---|---|---|---|
| 3,073,475 | 1/1963 | Fingerhut | 220/3 |
| 3,074,585 | 1/1963 | Koontz | 220/3 |
| 3,124,001 | 3/1964 | Conley | 220/3 |

Primary Examiner—George F. Lesmes
Assistant Examiner—P. R. Schwartz
Attorney, Agent, or Firm—Price, Heneveld, Huizenga & Cooper

[57] ABSTRACT

Attachment of a ring, particularly a metal ring (2), to an article which has walls or skirts (1) of fibre-reinforced resin material. The ring has a plurality of external grooves (3, 4, 5, 6). The skirt comprises, for each groove in sequence, a first (32, 36, 37, 40) and second (33, 38, 39, 41) layer of fibre-reinforced resin material. The fibres in the first layer have a substantial orientation in directions parallel with the axis of the ring and extend from the skirt into the respective grooves. Overlying the first layer is a second layer comprising hoop windings from the skirt towards the groove. The second layer lies at least partly in the groove to lock the first layer in the groove. This layering is repeated for each groove and finally successive hoop windings (45, 46, 47, 48) are wound over the entire article. This is useful for attaching end rings to rocket motor cases or for attaching rings to pressure vessels to define an aperture.

13 Claims, 6 Drawing Figures

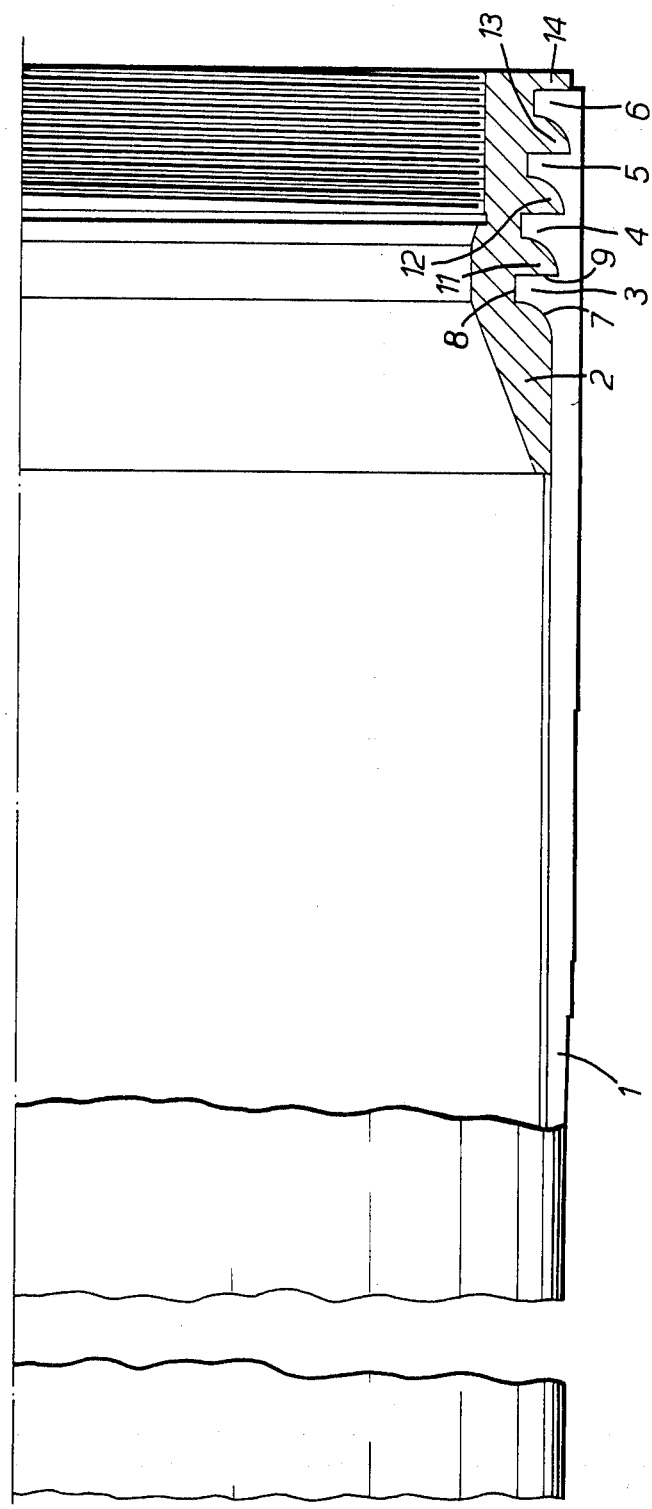

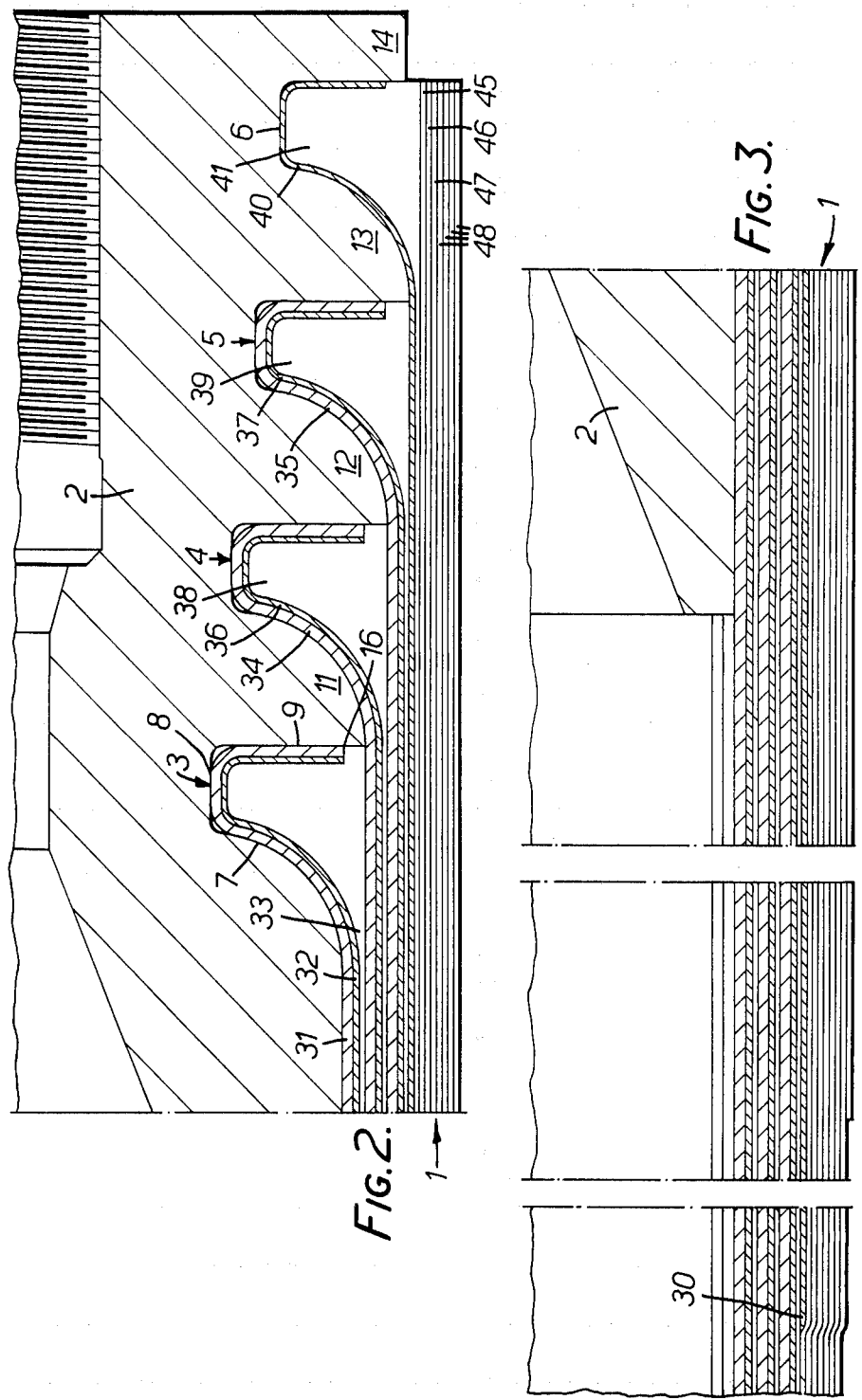

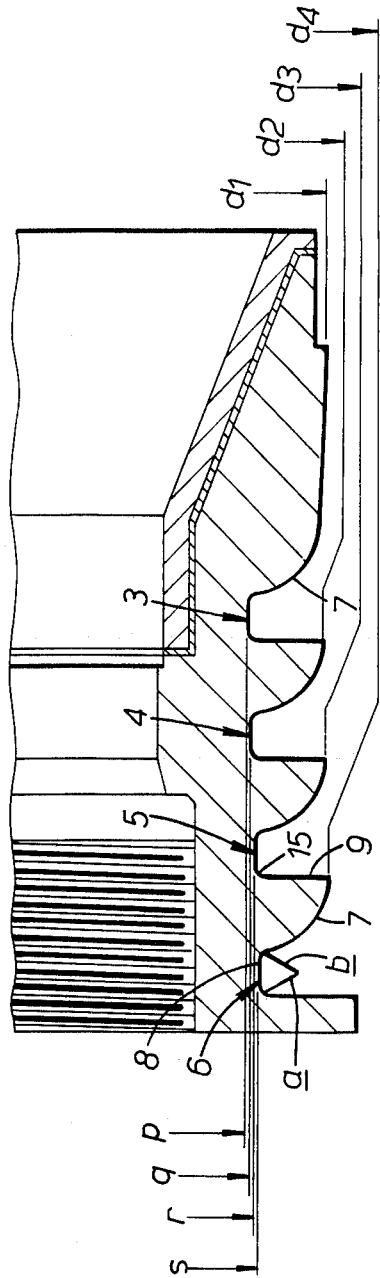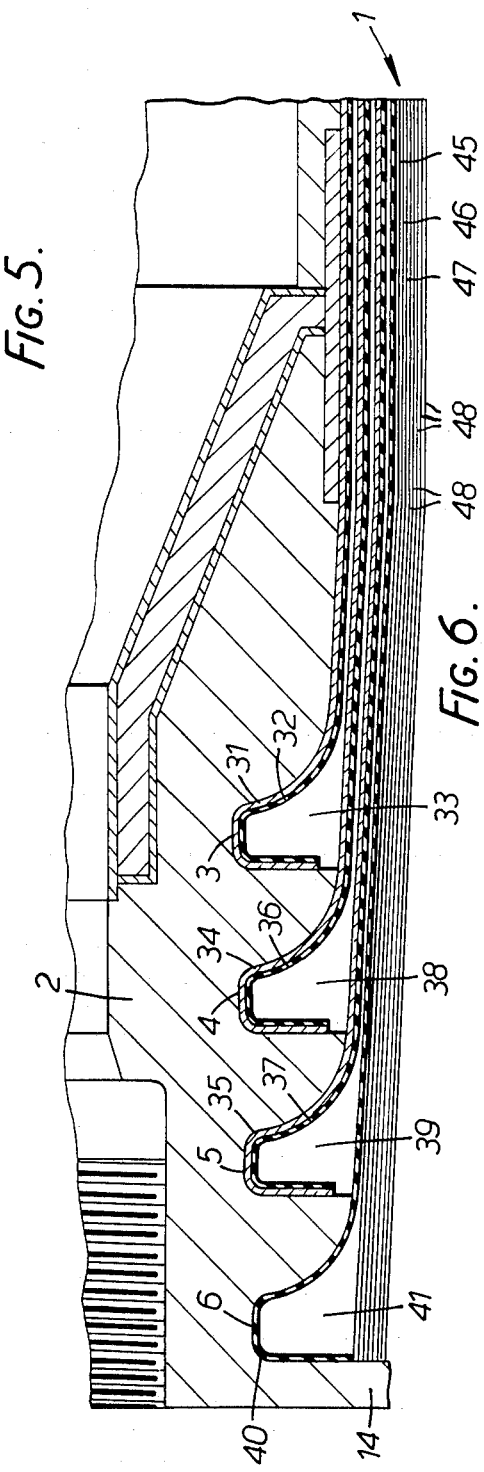

ATTACHMENT OF RINGS TO ARTICLES

This invention relates to the attachment of rings in articles which have walls (also referred to herein as skirts) of fibre reinforced resin material. One possible application of the invention is to the attachment of an end ring to the body wall of a rocket motor case. However, the invention may be applied to other articles such as pressure vessels which are open at only one point, ie, an aperture defined by the ring, and tubes which are open at opposite ends with a ring attached at either or both of the opposite ends. The invention is primarily concerned with the attachment of metal rings but could be applied to the attachment of rings of other materials.

GB No. 1402133 describes a corrugated structure and a method of making such a structure. The corrugated structure is built up on bridge supports of a first ply of tensioned parallel filament strands extending across all of the bridge supports along the axis of the structure. A second ply of parallel filament strands is applied transverse to and over the first ply so that the first ply is deflected into a generally concave parabolic configuration between and suspending from the bridge supports.

According to one aspect of the present invention a composite article comprises a ring, a plurality of external circumferential grooves in the ring, a skirt attached to the ring, first and second layers of fibre reinforced resin material comprising the skirt, the first layer having fibres with a substantial orientation in directions parallel with the axis of the ring and the second layer overlying the first layer and comprising a hoop winding, each groove in turn starting with the groove nearest to the skirt has a respective first layer having fibres with a substantial orientation in directions parallel with the axis of the ring extending from the skirt to within the respective groove and a second layer comprising a hoop winding and extending from the skirt and substantially fitting the groove.

According to another aspect of the invention, a vessel has a ring component, a fibre-reinforced resin wall forming a body of revolution, an opening on the axis of generation of the body, the opening being bounded by the ring component, a plurality of external circumferential grooves in the ring component, the wall comprising a plurality of layers, a layer for each groove in turn starting with groove nearest to the skirt which extends to within that groove the layer including fibres having a substantial orientation in directions which are generally axial of the vessel, a hoop winding of resin-impregnated fibre material to lock each of the said layers in a respective one of the grooves.

According to a third aspect of the invention a rocket motor case has a cylindrical wall of fibre-reinforced resin material, at one end a metal end ring, a plurality of external circumferential grooves in the end ring, the cylindrical wall comprising a first layer which includes fibres with a substantial orientation in directions parallel with the axis of the ring extending to within each groove in turn, and a respective hoop winding overlying the polar wound layer within the groove to retain the polar wound layer.

According to a fourth aspect of the invention, a method of securing a ring in a circumferential wall which comprises providing a ring, first and second external circumferential grooves in the ring, a layer of fibre-reinforced resin overlying the first groove, a second layer of fibre-reinforced resin applied by hoop winding to lock the first layer in the first groove, a third layer of fibre-reinforced resin overlying the first and second grooves, a fourth layer applied by hoop winding of fibre-reinforced resin to lock the third layer in the second groove, a fifth layer applied by hoop winding over the fourth layer, the layers constituting at least part of the said wall.

It will be noted that by means of the invention the wall or skirt is secured to the ring by the material of the wall being locked into the grooves of the ring by turns of a hoop winding. While there may be a bond between the material of the wall and the surfaces of the grooves, any transmission of load by the bond will be additional to that occuring because of the interlock.

The invention may be carried into practice in various ways but one rocket motor case embodying the invention will now be described by way of example with reference to the accompanying drawings, in which:

FIG. 1 is a fragmentary longitudinal section of one end of the motor case;

FIG. 2 is a view to a larger scale of part of the motor case shown in FIG. 1;

FIG. 3 is a continuation to the left of FIG. 2 of the motor case;

FIG. 5 is a detailed section of an end ring; and

FIG. 6 is a section similar to FIG. 2 showing the end ring of FIG. 5 in a motor case.

Figure 4:
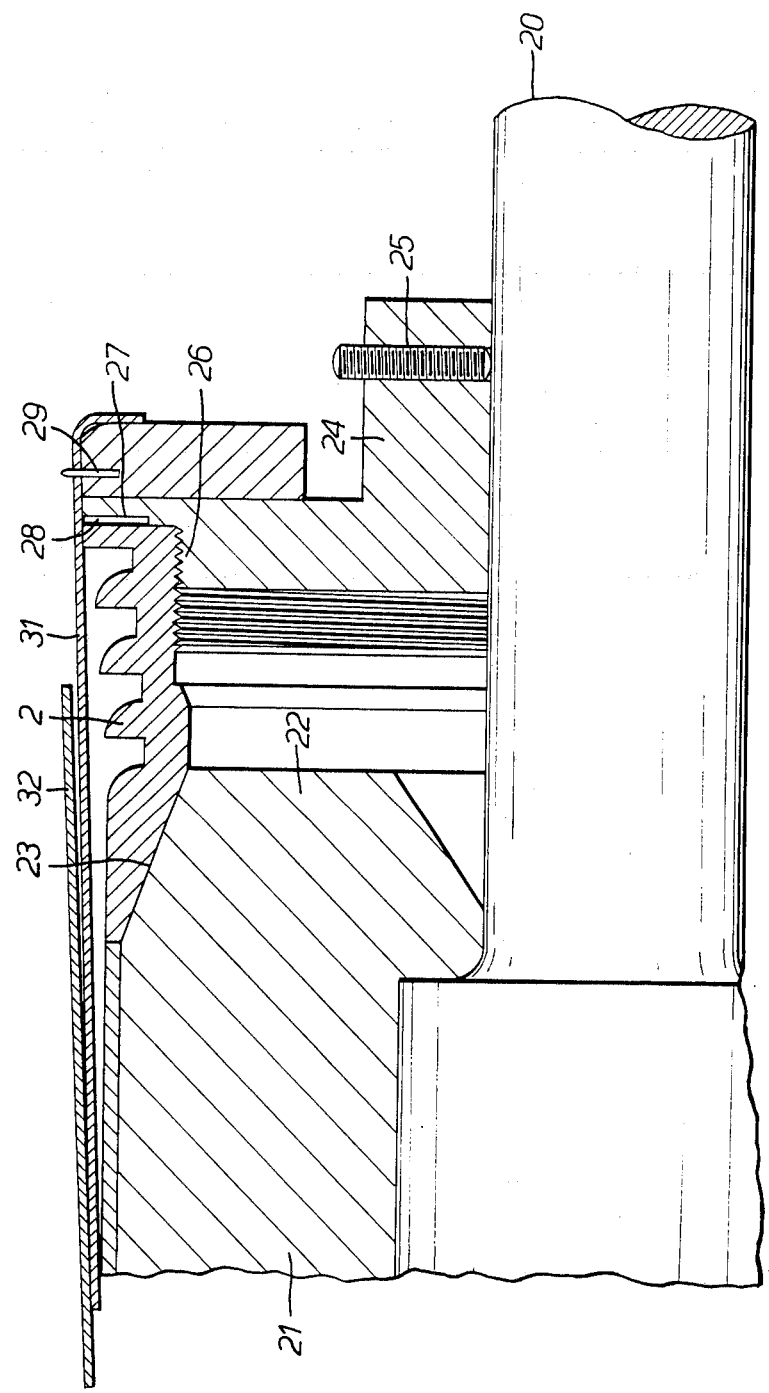
FIG. 4 is a diagrammatic view of a stage in the manufacture of the motor case.

The rocket motor case shown in FIG. 1 consists essentially of a tube having a generally cylindrical wall 1 made of fibre-reinforced resin with a metal end ring 2 secured in each end. The two ends of the motor case are similar to one another and for convenience the following description will, for the most part, refer only to one end. The motor case being described by way of example has an external diameter D which is approximately three times the length L of the end ring.

It will be seen from FIG. 2 that the metal end ring 2 is formed with four grooves 3, 4, 5 and 6 each of which is bounded by an inboard rounded wall portion 7, a flat bottom 8 and a radial outboard wall 9. The grooves are separated by ribs 11, 12 and 13 and the outboard groove 6 is bounded on its outboard side by a flange 14, the ribs and flange having progressively greater external diameters. As will be explained below, the cylindrical wall 1 in the vicinity of the end ring 2 is made up of a plurality of layers of three different kinds, the first kind being a laid layer having the fibres extending primarily longitudinally ie, parallel with the axis of the motor case; under this there may be a layer produced by polar winding, and thus also having the fibres extending primarily longitudinally, and then a layer produced by hoop winding.

FIG. 5 shows an end ring suitable for use in a motor case. The end ring is similar to that shown in FIGS. 1 to 4 and where the parts are the same the same reference numerals have been used. The inboard rounded wall portions 7 are formed from part of a circle with a radius r whose centre is a the base 15 of the radial outboard wall 9 as shown for one of the grooves, 5. The flat bottom 8 of each groove is curved to meet the inboard wall portion 7 with a radius a and is curved to meet the radial outboard wall 9 with a radius b. Radiis a and b can conveniently be the same. The outer diameter of the ring progressively increases away from the skirt and thus the diameters $d_1$, $d_2$, $d_3$, $d_4$ for successive grooves 3, 4, 5, 6 progressively increase. Also the distance of the flat bottoms 8 of successive grooves 3, 4, 5, 6 are progressively further from the axis of the ring and thus the distances p, q, r, s from the axis progressively increase.

The production of the motor case will now be described in detail with reference to FIGS. 2, 3 and 4.

Referring first FIG. 4, there is shown a steel mandrel 20 on which is formed a plaster of Paris former 21 having a tapered end portion 22 against which a tapered portion 23 of the inner wall of the end ring 2 is positioned. The end ring is securely located by means of a clamping ring 24 which is locked to the steel mandrel 20 by means of set screws 25. The clamping ring 24 has a rebate 26 which fits within the end rings 2 and the radially extending wall of the rebate 26 has a relieved portion 27 to provide a slot 28 between the relieved portion and the outer end of the end ring. The clamping ring carries a cylindrical row of projecting locking pins 29.

When the end rings have been assembled on the mandrel in the manner described, two layers of rubber are applied to the portion of the former 21 between the end rings 2. These layers are provided by strips of uncured rubber sold by Goodyear Rubber Company under the designation HYCAR MM 40/20, the strips being positioned so that the outer strips centrally overlie the joints between the inner strips. An apoxy adhesive, preferably that sold by Ciba-Geigy under the designation XD911, is applied to the exposed surfaces of the end ring 2 and a first polar cover 31 is then polar wound on to the assembly which will lie within the groove 3 to a point 16 before the end of the radial outboard wall 9. The polar cover comprises two wound layers of carbon fibre 0.254 mm thickness per layer of GRAFIL EXAS (sold by Courtaulds) pre-impregnated with a resin system with the following ingredients in the proportions shown:

Epikote 828: 100 parts by weight
Epikote 1031: 100 parts by weight
Epikure NMA: 180 parts by weight
BDMA: 1 part by weight.

Epikote and Epikure are Trade Marks of Shell Chemical Company. A layer 32 of longitudinally aligned carbon fibre sheet which extends from a point approximately 2.5 L from the outboard end of the end ring 2 to a point overlying the groove 4 is then accurately positioned over the polar winding to lie within the groove 3. A hoop winding 33 (FIG. 2) is then commenced from a point midway between the end ring towards one end. At a distance of approximately 1.25 L from the locking pins 29 the winding is halted and the polar wound layer 31 is cut across the cutting slot 28 using a sharp knife. Hoop winding is recommenced slowly towards the end of the assembly and at a point just on the outboard end of the inboard end of the ring 2 the tension on the fibre is raised and two turns are wound into the first groove 3 pressing both the polar wound layer 31 and the longitudinally aligned layer 32 into the groove. The winding tension is then reduced somewhat and a further twelve turns are wound into the groove 3, traversing backwards and forwards within the groove to consolidate the fibre within the groove. The winding tension is then reduced substantially and winding is continued until the groove 3 is filled to within 1 mm of the top of the rib 11. The projecting portion of the polar winding 31 is then cut off at a level just below that of the top of the rib 11. Hoop winding is continued until the groove 3 is filled level with the top of the rib 11. The procedure is then repeated at the other end of the motor.

The steps described and consisting of the winding of a polar wound layer 34, 35, the laying down of a longitudinally aligned layer 36, 37 and the production of a loop wound layer 38, 39 are then repeated for each of the grooves 4 and 5, the polar wound and longitudinally aligned layers being locked in the grooves 4 and 5 respectively by the hoop windings. For the fourth groove 6 the procedure is substantially the same except that the winding of the polar layer is omitted, the groove being occupied by a longitudinally aligned layer 40 and a hoop winding 41. In all cases the longitudinal layers of sheet or polar wound layers (31, 32, 34, 36, 35, 37 and 40) terminate within the respective groove. The hoop winding 41 is commenced at approximately 2.3 L from the end and the laid sheet 40 in which the fibres are longitudinally aligned is locked into the fourth groove. The longitudinally aligned layers extend from points which are respectively 2.3 L, 2.15 L and 1.5 L from the outboard end of the end ring 2, the inboard end 30 of the outermost longitudinally aligned layer 40 being visible in FIG. 3. The hoop winding by which the groove 6 is filled is continued back (layer 45) to the start 2.3 L from the end. The fibre is cut and repositioned 2.15 L from the end and is wound to the end and back to 1.5 L from the end (layers 46 and 47). This is repeated at the other end of the motor.

The motor is completed by winding four hoop layers 48 over the entire length of the motor. The resin is then cured whereafter the clamping rings 24 are removed and the steel mandrel 20 knocked out of the finished motor case. Then the plaster former 21 is washed out using boiling water.

FIG. 6 shows the end ring of FIG. 5 attached to a skirt to form a rocket motor case. This is similar to that shown in FIG. 2 and made according to the same method.

There may be only one layer having fibres with a substantial orientation in directions parallel with the axis of the ring and this may conveniently be a laid sheet of fibre reinforced material with the fibres orentated parallel with the axis of the ring or may conveniently be a polar winding of fibure reinforced resin material. Both types of layers may also be present as described in the embodiments.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A vessel having a ring component, a fibre-reinforced resin wall forming a body of revolution and having an opening at one end centered on the axis of generation of the body, the opening being bounded by the ring component, a plurality of external circumferential recessed grooves in the ring component, each groove having one wall facing toward said body and a second wall facing away from said body, said wall externally overlapping said ring component and comprising a plurality of layers, a layer for each successive groove starting with the groove nearest to the body, each layer extending into its groove and being seated against and bonded to both walls of its groove and being terminated adjacent the radial outer edge of the second wall of the groove, the layer including fibres having a substantial orientation in directions which are generally axial of the vessel, a separate hoop winding of resin-inpregnated fiber material overlaying each layer and hoop wound into the groove to lock each of the said layers into its respective groove, all of said fibers and layers of fibers being bonded together by resin material.

2. An article as claimed in claim 1 in which the outer diameter of the ring increases progressively away from the skirt.

3. An article having a cylindrical wall of fibre-reinforced resin material and at one end a metal end ring, a plurality of external axially spaced circumferential grooves in the end ring each groove having one wall facing toward said body and a second wall facing away from said body, said wall externally overlapping said ring component and, the cylindrical wall comprising a plurality of layers each layer of which includes fibres with a substantial orientation in a direction parallel with the axis of the wall and ring, each successive layer extending into and terminated within and bonded to the walls of one of the grooves, and at each groove a hoop winding overlying the axially oriented layer of fibres within the groove to lock the axially oriented layer of fibres into the groove and fill the groove.

4. An article as claimed in claim 3 which includes for at least some of the grooves a third layer under the first and second layers, the third layer comprising an axial winding of fibre-reinforced resin material.

5. A tubular vessel having an orifice and a ring forming the outer end of and surrounding the orifice, a fibre-reinforced resin wall forming said tubular vessel and overlapping the ring, the ring having a plurality of external circumferential grooves each having oppositely facing radially extending walls, the ring overlapping portion of said wall forming means for securing said ring to said vessel and comprising a plurality of layers, a layer for each groove in turn starting with the groove nearest to the vessel with the layer extending into and seated against both walls of that groove, each layer including fibres having a substantial orientation in a direction generally axial of the vessel, a hoop winding of a resin-impregnated fibre material overlying each layer, pressing it into its groove and substantially filling the groove.

6. A tubular article having a body of tubular material and an end ring, said body having an end portion providing means for attaching the ring to the body, the ring having a plurality of axially spaced circumferential grooves separated by radially extending ribs, said body and its end portion including a plurality of laminates of plastic coated fibres, the number of laminates being equal to the number of grooves, with each radially outwardly successive laminate terminating in the next axially outward successive groove, each laminate except the one terminated in the axially outermost groove including an inner layer of polar wound fibers, an intermediate layer of axially oriented fibres and an outer layer of hoop wound fibres with the hoop wound fibres of the outer layer pressing the fibres of the inner and intermediate layers tightly into the groove in which the laminate terminates and substantially filling said groove, the laminate extending into the outermost groove omitting said inner layer, all of said layers and laminates being bonded together by said resin.

7. The tubular article described in claim 6 wherein the ribs of the ring are of progressively greater diameter in an axial direction away from the body.

8. The tubular article described in claim 7 wherein the inner and intermediate layers of each laminate terminate adjacent the radially outer end of the axially inwardly facing wall.

9. The tubular article described in claim 8 wherein the tubular article is a rocket motor case.

10. The tubular article described in claim 7 wherein each groove has an axially outwardly facing wall and an inwardly facing wall, the outwardly facing wall of each groove being radiused radially inwardly.

11. The tubular article described in claim 10 wherein the outer surface of said body includes a plurality of layers of hoop wound plastic bonded fibres.

12. The tubular article described in claim 6 wherein each groove has an axially outwardly facing wall and an inwardly facing wall, the outwardly facing wall of each groove being radiused radially inwardly.

13. The tubular article described in claim 6 wherein the fibres of the inner layer of each laminate are tensioned.

* * * * *